United States Patent [19]

Smith

[11] 4,294,181
[45] Oct. 13, 1981

[54] SUBSOIL AGRICULTURAL IMPLEMENT WITH ROTATABLE DISC

[76] Inventor: Franklin Smith, Potlatch, Id.

[21] Appl. No.: 157,805

[22] Filed: Jun. 9, 1980

Related U.S. Application Data

[63] Continuation-in-part of Ser. No. 950,124, Oct. 10, 1978, abandoned.

[51] Int. Cl.³ .......................... A01C 7/20; A01B 33/06
[52] U.S. Cl. .......................................... 111/87; 111/7;
111/85; 172/39; 172/59; 172/111; 172/522; 172/570; 172/169; 172/66
[58] Field of Search ...................... 111/6, 7, 85, 87, 11; 172/522–526, 39, 169, 570, 66, 111, 59

[56] References Cited

U.S. PATENT DOCUMENTS

| | | | |
|---|---|---|---|
| 458,371 | 8/1891 | McSherry | 111/85 |
| 459,971 | 9/1891 | Arnett | 172/522 |
| 556,075 | 3/1896 | Whipple | 172/522 |
| 673,304 | 4/1901 | Tharp et al. | 172/522 |
| 835,031 | 11/1906 | Myers | 111/85 |
| 848,613 | 3/1907 | Fehrenbacher | 172/310 |
| 1,065,883 | 6/1913 | Manfull | 172/522 |
| 1,105,570 | 7/1914 | Lea et al. | 111/87 |
| 1,158,906 | 11/1915 | Eccles | 172/522 |
| 1,370,774 | 3/1921 | Abernathy | 172/522 |
| 1,683,768 | 9/1928 | Etheredge | 172/526 X |
| 2,355,229 | 8/1944 | Miller | 172/39 |
| 2,381,005 | 8/1945 | Schultz et al. | 172/524 |
| 2,573,992 | 11/1951 | Schultz et al. | 172/523 X |
| 2,577,363 | 12/1951 | Poynor | 111/59 |
| 2,776,612 | 1/1957 | Guyer | 172/39 |
| 3,129,773 | 4/1964 | Freeman | 172/522 |
| 3,146,740 | 9/1964 | Phillips | 111/7 |
| 3,447,495 | 6/1969 | Miller et al. | 111/7 |
| 3,503,449 | 3/1970 | Schaper | 172/39 |
| 3,804,036 | 4/1974 | Seifert, Jr. | 111/7 X |
| 3,895,589 | 7/1975 | Garner et al. | 111/7 |

FOREIGN PATENT DOCUMENTS

| | | | |
|---|---|---|---|
| 124777 | 6/1947 | Australia | 111/85 |
| 2651877 | 5/1978 | Fed. Rep. of Germany | 111/7 |
| 7506200 | 11/1976 | Netherlands | 111/7 |
| 363446 | 3/1973 | U.S.S.R. | 111/87 |
| 434909 | 7/1971 | U.S.S.R. | 111/7 |

*Primary Examiner*—Steven A. Bratlie
*Attorney, Agent, or Firm*—Wells, St. John & Roberts

[57] ABSTRACT

A subsoil implement is disclosed that utilizes a horizontally rotatable disc that is moved beneath the surface of the ground for the purpose of cultivating or for producing a sub-surface bed for placing flowable material such as seed or soil treating gas along the prepared bed. A hollow delivery tube or rigid shaft leads to the disc and rotates about an axis defined by a bearing directly adjacent the disc. Seed or chemicals may be directed through the hollow tube form to the ground surface below the cultivator disc. Therefore, cultivating, planting or soil treatment can be accomplished with minimal effort. Trash clearing elements are provided on the rotating tube or shaft to eliminate trash build-up and minimize disruption of the soil surface.

8 Claims, 9 Drawing Figures

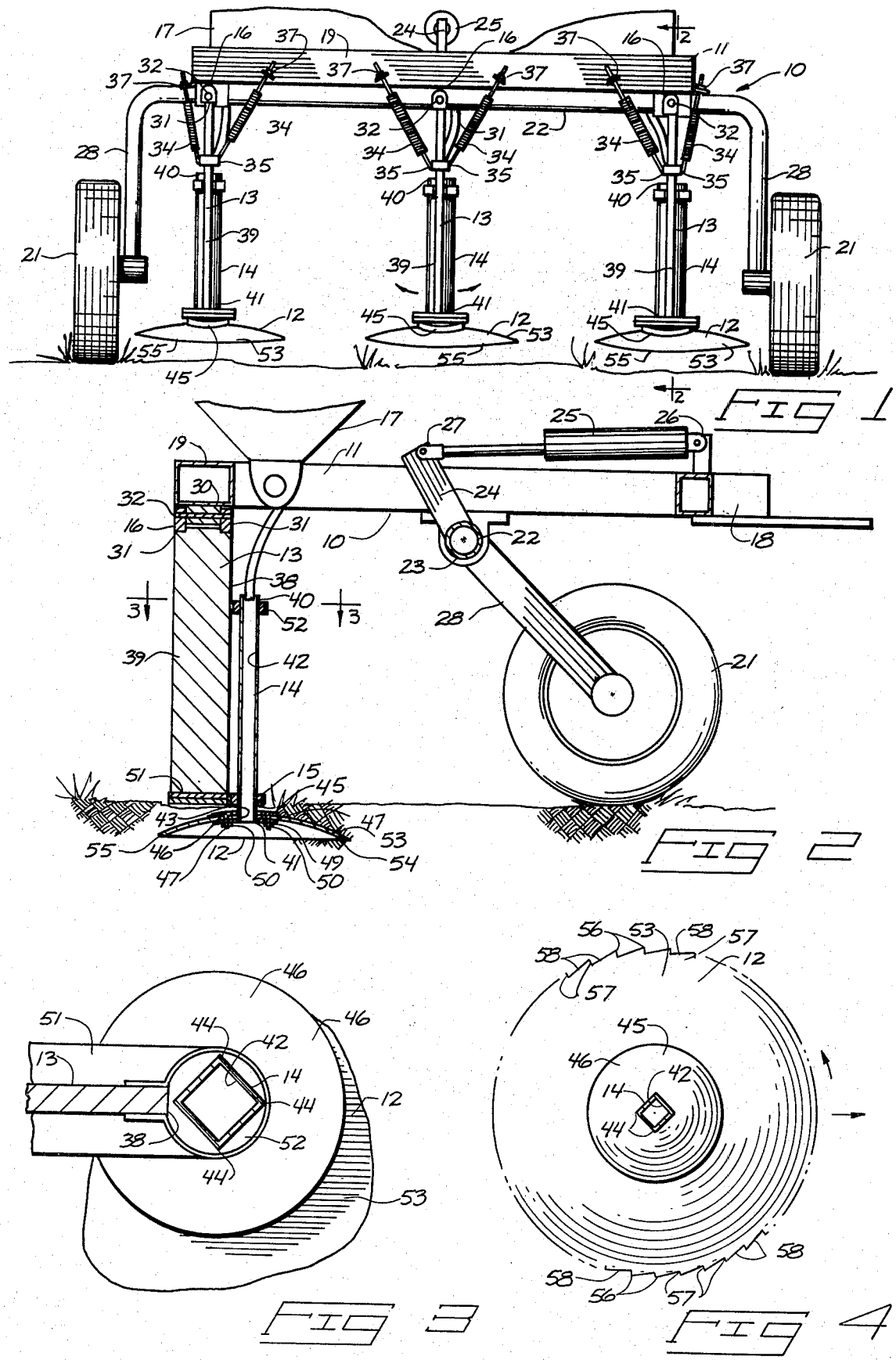

4,294,181

SUBSOIL AGRICULTURAL IMPLEMENT WITH ROTATABLE DISC

RELATED APPLICATIONS

This application is a continuation-in-part of U.S. Pat. application Ser. No. 950,124 filed Oct. 10, 1978 and now abandoned.

BACKGROUND OF THE INVENTION

The present invention is related to agricultural apparatus using substantially horizontal discs for cultivating, planting, or spreading chemicals.

The planting of seeds is usually accomplished commercially on farms through the use of elaborate seed drills. Such drills typically include a furrow opener and a seed discharge tube behind the furrow opener. Seed is dropped through the tube and into an open furrow formed in the ground surface. This furrow must then be closed over the top of the seeds, usually by trailing tamping wheels.

Cultivating the ground surface is not usually accomplished simultaneously with the planting operation. Cultivating also involves breaking of the ground surface by some type of ground opening and soil manipulating device pulled along behind a tractor. Examples are harrows, rod weeders, plows, etc.

Subsoil discs have been used that are pulled in a horizontal orientation below the soil surface for cultivating, planting and fertilizing. They may rotate below the ground surface as they are pulled in a forward direction to engage and cut through the roots of weeds and to slightly lift and agitate the soil above the disc. The advantage of horizontal disc cultivating is that the horizontal oriented discs require minimal pulling forces for movement through the soil. Another advantage is that the soil surface is not substantially disturbed.

After loosening the soil with a horizontally rotatable disc, a seeding operation may follow in which a furrow is opened and the seed is then planted in the previously cultivated soil. This not only involves a second operation but requires additional energy to open the planting furrow and close it again. Further, the disruption of the soil surface may encourage loss of top soil through erosion from wind and water.

Modern soil treatment includes the application of various forms of gaseous chemicals to the soil. Obviously, unless the gas is heavier than air there must be some provision for injecting and maintaining the gas in contact with the soil. Various subsurface tools have been devised for sub-surface injecting or releasing of gaseous chemicals. The injectors themselves may operate effectively but the ground engaging element leading to the discharge often presents a problem. Trash builup on the leading edge of the ground engaging elements forms furrows of increasing size as the implement is pulled along, especially in stubble for "no till" operations. The enlarged furrow leads down to the gas discharge and therefore provides an easy escape route for the gases.

Known forms of horizontal disc cultivators, planters, or fertilizer spreaders use rotating discs on fixed or pivoted upright shafts or tubes. None, however, have adequate bearing mounts for the discs, especially where the discs and attached shafts or tubes rotate with the discs. Forces applied to the discs and shafts, as well as the gritty environment have often caused early bearing failure or bending along the supporting shafts or tubes.

The force and wear factors increase in "no till" applications where the cultivating, planting, etc. is to be accomplished in stubble. It is practically impossible to rotatably support a subsoil implement about an upright axis by bearings arranged as demonstrated by prior forms of such implements in no till operations.

It therefore becomes desirable to provide some effective form of sub-surface implement that will enable cultivating, planting or dispersion of fertilizer material with minimal disruption of the soil surface, along with adequate bearing support that will allow operation in "no till" situations.

BRIEF DESCRIPTION OF THE DRAWINGS

FIG. 1 is a rear end elevational view of the present implement;

FIG. 2 is a sectional view of the device taken along line 2—2 in FIG. 1;

FIG. 3 is a sectional view taken along line 3—3 in FIG. 2;

FIG. 4 is a fragmentary plan view of an alternate form of disc for my device;

DETAILED DESCRIPTION OF PREFERRED EMBODIMENTS

Figure 5:
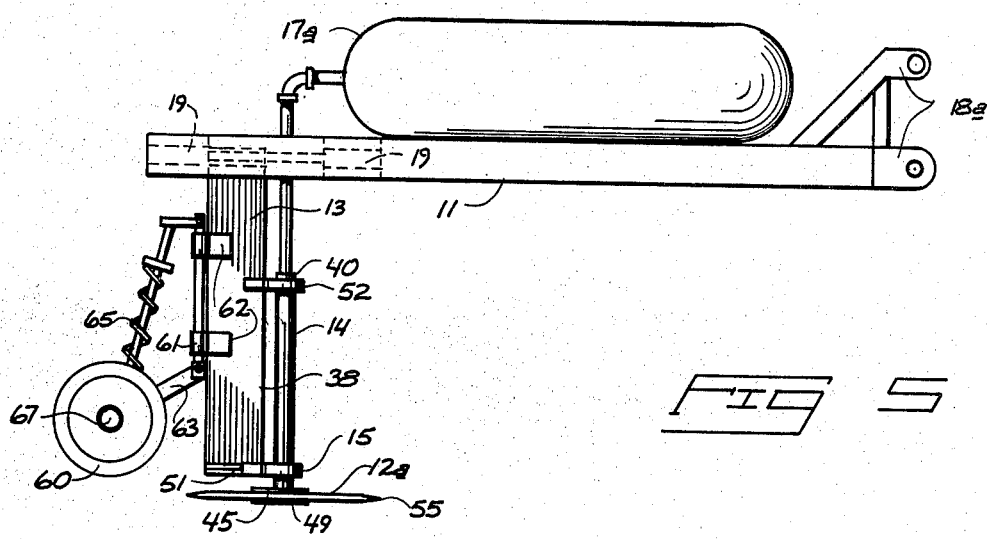
FIG. 5 is a view of the present device used as a chemical applicator and is shown with a 3 point hitch frame arrangement.

The present implement is illustrated in the accompanying drawings by the reference character 10. It basically includes framework 11 that may be attached to a draft vehicle (not shown) such as a farm tractor. A wheeled frame is shown in FIGS. 1 and 2. A three point hitch frame arrangement is shown in FIG. 5.

Both forms of the framework 11 mount one or more downwardly depending supports 13. These supports 13 rotatably mount circular cultivator discs 12 at their lower ends. Either frame may be operated to lower the discs 12 below the ground surface. The frame may then be pulled along with the discs moving beneath the ground surface to cultivate the adjacent soil.

Hollow delivery tubes 14 or, alternatively, solid upright shafts 70 may be affixed to the discs 12. They lead upwardly, coaxially with central axes of the discs along the supports 13. Tubes 14 receive and direct flowable material such as seed (FIG. 1) or gas (FIG. 5) to the soil surface beneath the discs. The tubes 14, or shafts 70 rotate with the discs about their central axes through bearings 15 (FIG. 2) located at the lower ends of the supports 13. The supports 13 and discs 12 are mounted to the framework 11 through a spring mounting means 16 which may enable lateral deflection should a disc or support engage in immovable obstruction as it is pulled along. An appropriate means for metering and directing seed or gas to the delivery tubes 14 are shown generally in FIGS. 1 and 2 at 17 and in FIG. 5 at 17a.

It should be noted that means 17 and 17a may be any appropriate form of storage and metered delivery device. Such devices are well known in the agricultural arts and will not be discussed herein in further detail. It should also be noted that "seed" is used in the broadest generic sense as including all forms of propagative plant structure that require subsurface planting.

The wheel supported framework is shown in substantial detail by FIGS. 1 and 2. It includes a tongue 18 at a forward end that is adapted for connection to a draft vehicle. A 3 point hitch member 18a is located at the forward end of the frame version shown in FIG. 5. Rearward of the tongue or hitch members are transverse cross members 19 to which the supports 13 are mounted.

Means is provided on framework 11 for raising and lowering the discs 12. In the FIG. 5 embodiment, it is simply comprised of one of the 3 point hitch connectors which mounts to an elevating ram cylinder or screw on a tractor. On the framework of FIGS. 1 and 2 the raising and lowering means includes freely rotatable wheels 21 mounted at ends of longitudinally projecting portions 28 of a torsion tube 22. The tube is mounted at a pivot 23 on the frame for movement about a transverse axis. A crank arm 24 projects upwardly from the torsion tube 22. A hydraulic cylinder 25 has an end 26 affixed to frame 11 and a remaining end 27 mounted to the crank arm 24. Extension and retraction of the hydraulic cylinder 25 will cause corresponding pivotal movement of the torsion tube. The longitudinal projected portions 28 of the tube will pivot the wheels about the axis of pivot 23 to correspondingly raise and lower the framework.

The supports 13 are mounted through the spring mounting means 16 to the framework 11. The spring mounting means 16 is illustrated in some detail by FIG. 1. It may include a pivot bracket 30 mounted on the framework 11. Upper ends 31 of the supports 13 are movably connected about longitudinal axes at the brackets 30. Pivot pins 32 (FIG. 2) join the brackets 30 and upper support ends 31 to permit pivotal movement of each support to both sides of a vertical plane about its longitudinal axis.

The supports 13 are urged toward an upright condition by means of coiled tension springs 34 (FIG. 1) situated on opposite sides of the supports. The springs are attached at ends 35 to the supports at locations downward of the pivot pins 32. They extend from there angularly upward to the framework 11.

The supports 13 are preferably formed of heavy bar stock of rectangular cross section. Each support 13 includes upright forward edges 38 and parallel upright rearward edges 39 (FIG. 2). The planter tubes 14 are mounted slightly forward of the forward edges 38.

Each delivery tube 14 as briefly discussed above is hollow along its length. It extends from an upper end 40 to a lower end 41. A bore 42 that is preferably coaxial with the central disc axis extends between the ends and openly communicates with a bore 43 formed through the disc 12. Seed or gas is received through bore 42 and 43 from the seed directing means 17 or gas supply 17a.

Figure 6:
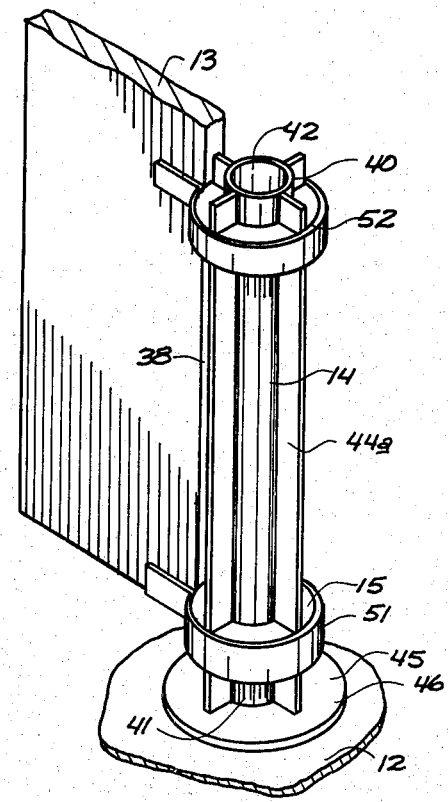
FIG. 6 is a fragmentary pictorial view showing an alternate form of a trash cutting arrangement for my implement.
Figure 7:
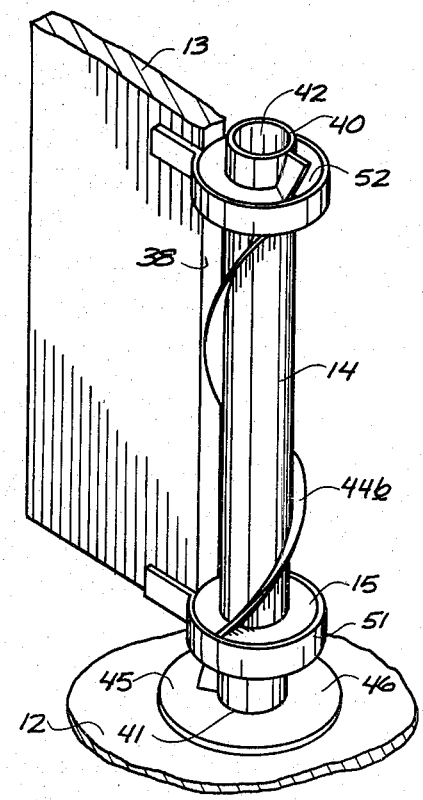
FIG. 7 is a view similar to FIG. 6 only showing another trash cutting arrangement.

A trash clearing means may be supplied along each tube 14 or shaft 70 for cutting trash against the adjacent support 13 as the tube or shaft is rotated. FIGS. 3, 6 and 7 show three examples of the trash clearing means.

In FIG. 1 the tube has a polygonal cross section with corners 44 (FIG. 3). Corners 44 are situated about the rotational central disc axis and are positioned in close relation to the forward edge 38 of support 13. Thus, any trash engaged by tube 14 as the device is pulled along the ground will be chopped and severed between forward edge 38 and corners 44.

The FIG. 6 version of the trash clearing means makes use of a cylindrical tube 14 and axial trash cutting vanes 44a. The rotating vanes 44a will slice or chop through trash against the adjacent supports 13. FIG. 7 shows another example, embodying one or more spiral blades 44b for slicing through and clearing trash from the path of supports 13. The spiral blades may be wound in a direction complimentary to the direction of rotation for the discs so they will move trash in "auger" fashion axially from the ground surface. Thus the spiral blades will thereby further assist in removal of trash from the path of the adjacent supports 13. The cutting action of blades 44b against adjacent supports 13 will resemble that of a reel lawn mower.

Each end 41 of the tubes 14 and shafts 70 includes a hub means 45 for releasably mounting a disc. The discs may therefore be removed and replaced if damaged or worn. The hub means 45 may include a stud plate 46 affixed at the lower end 41 of each planting tube. Downwardly projecting studs 47 may be received through complementary holes in the discs. Clamp rings 49 are provided to receive the studs 47 on convex sides of the discs. Nuts 50 clamp the rings 49 to sandwich the discs between rings 49 and plates 46, securely mounting them to the planting tubes 14 or rigid shafts 70.

Each bearing 15 is situated immediately above the hub means 45 to provide a maximum amount of stability at the level where the disc will operate below the ground surface. The bearing 15 is mounted on a bearing bracket 51 that projects forwardly from the lower end of the support 13. The bearing 15 may be of the sealed variety that may be used with sub-surface ground working tools. The bearings are located directly adjacent the discs to transmit forces (lateral) to the supports, avoiding bending of the tube 14 or shaft 70.

A second bearing may be provided at the upper end of planting tube 14. However, a simple journal or retaining sleeve 52 may be used to rotatably support the upper planter tube ends for rotation about the central disc axis.

Figure 8:
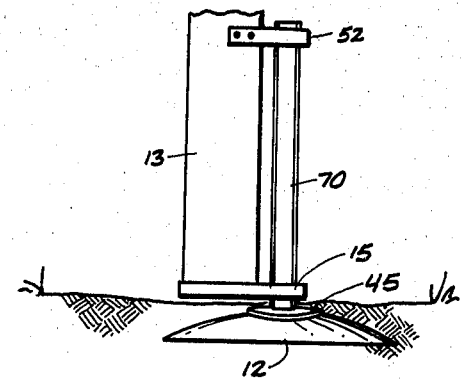
FIG. 8 is a fragmentary view showing the present device with a rigid shaft and disc arrangement.

The individual discs 12 of the configuration shown in FIGS. 1, 2 and 8 include upper convex surfaces 53 and lower concave surfaces 54. These two surfaces 53 and 54 are joined by a circular peripheral edge 55 generated about the central disc axis. The upper convex surface 53 is joined to the stud plate 46. The lower concave surface 54 receives the clamp ring 49. The bores 43 are formed through the discs between the surfaces 53,54 at their centers to coaxially and openly communicate with the bores 42 formed through the planter tubes 14.

Means is also provided for causing rotation of the discs in response to forward movement of the framework while the discs are held at an elevation below the ground surface. Such means may include a spring adjusting means as shown in FIG. 1 or a specially designed toothed configuration at the disc peripheries as shown by FIG. 4.

The spring adjusting means (FIG. 1) may be provided in the form of threaded axial ends of the springs extending through brackets on framework 11 to threadably receive tension adjusting nuts 37. The nuts 37 may be adjusted on opposite sides of the supports so that one spring is placed under greater tension than the other. This imbalance causes the support bar and attached disc to be laterally inclined (the central disc axis being inclined laterally from the vertical). Frictional engagement with the soil will be greater on one side of a disc than on an opposite side, since one side will have a greater amount of soil above it. The frictional differential on opposite sides of the inclined central disc axis results in rotation of the disc from the low resistance side to the high resistance side.

The toothed form of the disc 12 is illustrated in FIG. 4. Each disc may include a plurality of peripheral teeth 56 that may be utilized as means for causing rotation of the discs in response to forward movement of the discs below the ground surface. Each toothed 56 has a somewhat radial leading edge 57 and a somewhat tangential trailing edge 58. The leading edges 57 face the soil forward of the disc on one lateral side of the disc. On an opposite disc side, the edges 57 are hidden by the angularly inclined trailing edges 58. Engagement of soil by the leading edges will cause rotation of the disc about the central disc axis.

A flat disc 12a is shown in FIG. 5 in conjunction with conventional gas supply and delivery equipment. The flat disc includes a sharp peripheral edge (which may also include the FIG. 4 toothed configuration) and parallel opposed upper and lower disc surfaces. The flat discs will offer even less resistance to forward sub-surface movement than the arcuate surfaces 53 and 54. Furthermore, the flat nature of discs 12a will discourage upward movement of gas delivered through tube 13.

FIG. 5 also illustrates a soil tamping assembly used to firmly tamp the soil over the seed bed or sub-surface plane in which gas is to be dispensed. Tamping wheels 60 are rotatably carried behind each support 13 by a pivot frame 61. Included with frame 61 are a hinge assembly 62 and wheel link member 63. The hinge assembly 62 provides a "caster" effect, allowing the tamping wheels to track behind the support 13, even during cornering. Adjustable spring biasing mechanisms 65 extend between tamping wheel axles 67 and upper ends of the hinge assemblies 62. They, along with link members 63 allow vertical movement of the tamping wheels 60 relative to the discs 12. Spring mechanisms 65 also function to produce a selected downward pressure on the tamping wheels 60. The slightly disturbed subsurface plane of soil produced by the discs will be compacted by the wheels 60, assuring seed-soil contact during planting operations or retention of gases within the soil during various chemical soil treating operations.

Figure 9:
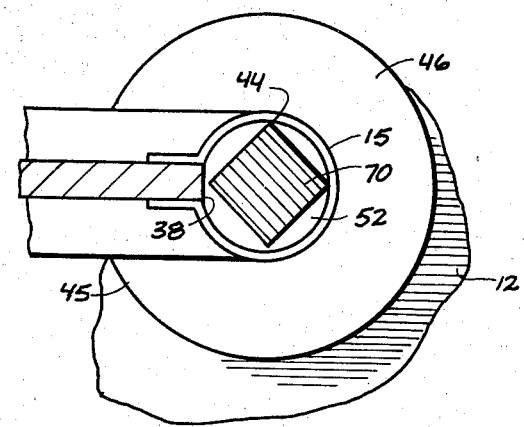
FIG. 9 is an enlarged sectional view of the rigid shaft and disc arrangement shown by FIG. 8.

FIGS. 8 and 9 show a form of the present implement used exclusively for cultivating. Details of the bearing and frame assembly is basically the same as described for the forms shown in FIGS. 1-7. The form shown in FIGS. 8 and 9, however, makes use of solid upright shafts 70 in place of the tubes 14. The shafts 70 are preferably of a polygonal cross-section to perform the trash clearing operations as described above. Rectangular bar stock that is commercially available in standard sizes has been used effectively in shaft construction. Operation of the cultivator form of the present implement is similar to the operation of the seed planting and fertilizer forms as described below.

In operation for seeding, the present framework 11 is connected to a draft vehicle and the seed directing means 17 is filled with seed. Forward motion of the framework may then be initiated as the pulling implement is driven forwardly.

The hydraulic cylinder 25 of the FIG. 1 frame version may be operated simultaneously to lower the discs below the ground surface to a prescribed depth suited for planting. The FIG. 5 frame version may be lowered by the tractor operator in the same manner that any other 3 point hitch implement is raised or lowered.

The rotating discs, whether inclined, toothed or both, cause corresponding rotation of the planter tubes 14. Any trash or obstacles encountered by the rotating tubes will either be deflected or chopped into small pieces by the corners 44, vanes 44a or blades 44b as they come into close proximity with the forward edges 38 of the supports 13.

The rotating discs will cultivate by loosening the soil at the prescribed level below the ground surface and by cutting through the roots of undesirable plants.

Planting is accomplished simply by dropping seeds through the planter tubes 14 from the open upper ends 40 using seed storage and metering assembly means 17. The seeds will fall to the subsurface elevation of the disc and drop through the bore 43 into the ground below the disc surface 54. The seeds will drop through the bore and onto a table or plane or cultivated soil that has been defined by the peripheral edge 55 of the associated discs. Once the seed has dropped and has passed rearwardly of the trailing portion of the peripheral edge 55, the soil above will drop back down about the seed. If the tamping wheels are used, the soil will be compacted firmly about the seeds. No "furrow" is formed and the ground is both cultivated and planted simultaneously. The supports 13 are narrow and longitudinally oriented so they will not significantly disturb the soil surface.

Chemical treatment of soil can be accomplished by providing a chemical supply tank or pressure chamber approximately valved and connected to the tubes 14. Pressurized fluid gas can then be delivered to the subsurface plane of the discs. It is preferable to use the flat disc form 12a (FIG. 5) with gas application as the ground will be disturbed only along the plane of the discs and supports. The gas will therefore have less chance of escaping upwardly after the discs have passed over. Further sub-surface entrapment of the gas may be accomplished by using the tamping wheels 60, which will compact the soil plane loosened by the discs 12a and the slightly disturbed area left behind the supports 13. No trash buildup can occur in front of the supports 13, due to the operation of the trash clearing means along each tube 14.

It is to be understood that the above description is given by way of example to set forth preferred forms of my invention. Other forms or modifications may be envisioned that fall within the scope of the following claims.

What I claim is:

1. A subsurface agricultural implement comprising:
   a framework;
   a circular cultivator disc having oppositely facing upper and lower surfaces joined at a peripheral edge formed about a central disc axis;
   an elongated rigid disc support having an upright forward edge and an upright rearward edge, and an upper end mounted to the framework;
   an upright delivery tube fixed to the cultivator disc at a lower tube end and extending upwardly therefrom centered and preceding the forward edge of the disc support to an upper tube end, said delivery tube being centered along the disc axis as a coaxial extension thereof;
   bearing means on said disc support mounting the delivery tube to the disc support for rotation of the delivery tube about the central disc axis, said bearing means comprising first and second coaxial rotational bearings mounted to the disc support at two axial spaced locations with an exposed section of the tube between said bearings, one of which is located on said disc support elevationally adjacent said disc at said lower tube end;

an open bore extending through the delivery tube from its upper end to its lower tube end;

said disc including a central opening formed therein in alignment with the open bore;

means on said framework for lowering the disc to an elevation below the soil surface;

means for causing rotation of the disc and delivery tube about the central disc axis in response to forward movement of the framework while the disc is elevationally below the ground surface;

means on said framework for directing a flowable material to the open bore at the upper tube end; and trash clearing means on the delivery tube for preventing buildup of trash against the disc support as it is moved along the ground;

a pivot bracket and pin joining an upper end of the disc support to the framework for transverse pivotal movement about a longitudinal axis; and spring means interconnecting the disc support and said framework for normally urging the disc support toward an upright position.

2. The implement as defined by claim 1 wherein said means for causing rotation of the disc and delivery tube comprises spring adjusting means interconnecting the spring means and framework for selectively producing a yieldable lateral incline of the central disc axis relative to said framework.

3. The implement as defined by claim 1 wherein the trash clearing means is comprised of axial corners formed along the delivery tube, rotatable with the tube adjacent a forward edge of the disc support.

4. The implement as defined by claim 1 wherein the trash clearing means is comprised of axial vanes on the delivery tube, rotatable with the tube adjacent a forward edge of the disc support.

5. The implement as defined by claim 1 wherein the trash clearing means is comprised of a spiral blade on the delivery tube, rotatable with the tube adjacent a forward edge of the disc support.

6. An agricultural implement, comprising:

a supporting framework adapted to be attached to a draft vehicle for movement in a longitudinal direction;

a circular cultivator disc having oppositely facing upper and lower surfaces joined at a peripheral edge formed about a central disc axis;

an elongated rigid disc support depending downwardly from the framework, said disc support including an upright forward edge facing in the intended direction of movement of the framework;

pivot means connecting the disc support to the framework about a longitudinal axis for permitting pivotal movement of the disc support to both transverse sides of a vertical plane containing the longitudinal axis;

an upright shaft having a lower end fixed to the cultivator disc and extending upwardly therefrom centered and preceding the forward edge of the disc support, the outer surfaces of the shaft being centered along an extension of the disc axis;

first and second rotational bearings mounted to the disc support at elevationally spaced positions beneath said pivot means, said bearings rotatably journalling said shaft about an extension of the disc axis with an exposed section of the shaft between the bearings being longitudinally aligned with the disc support at a position directly adjacent its forward edge, one of said bearings being located on said disc support elevationally adjacent said disc at said lower shaft end;

spring means operably connected between the framework and disc support for yieldably urging the disc support to an upright position;

and means for rotating the disc and shaft about the disc axis in response to longitudinal forward movement of the framework while the disc is at a subsoil elevation.

7. The implement set out in claim 6 wherein the shaft has axial corners located between the bearings in close relation to the forward edge of the disc support.

8. The implement as defined by claim 6 wherein said means for causing rotation of the disc and shaft comprises spring adjusting means interconnecting the spring means and framework for selectively producing a yieldable lateral incline of the central disc axis relative to said framework.

* * * * *